Oct. 31, 1933.  E. M. POST, JR., ET AL  1,932,533
REFRIGERATING BODY
Filed May 11, 1933
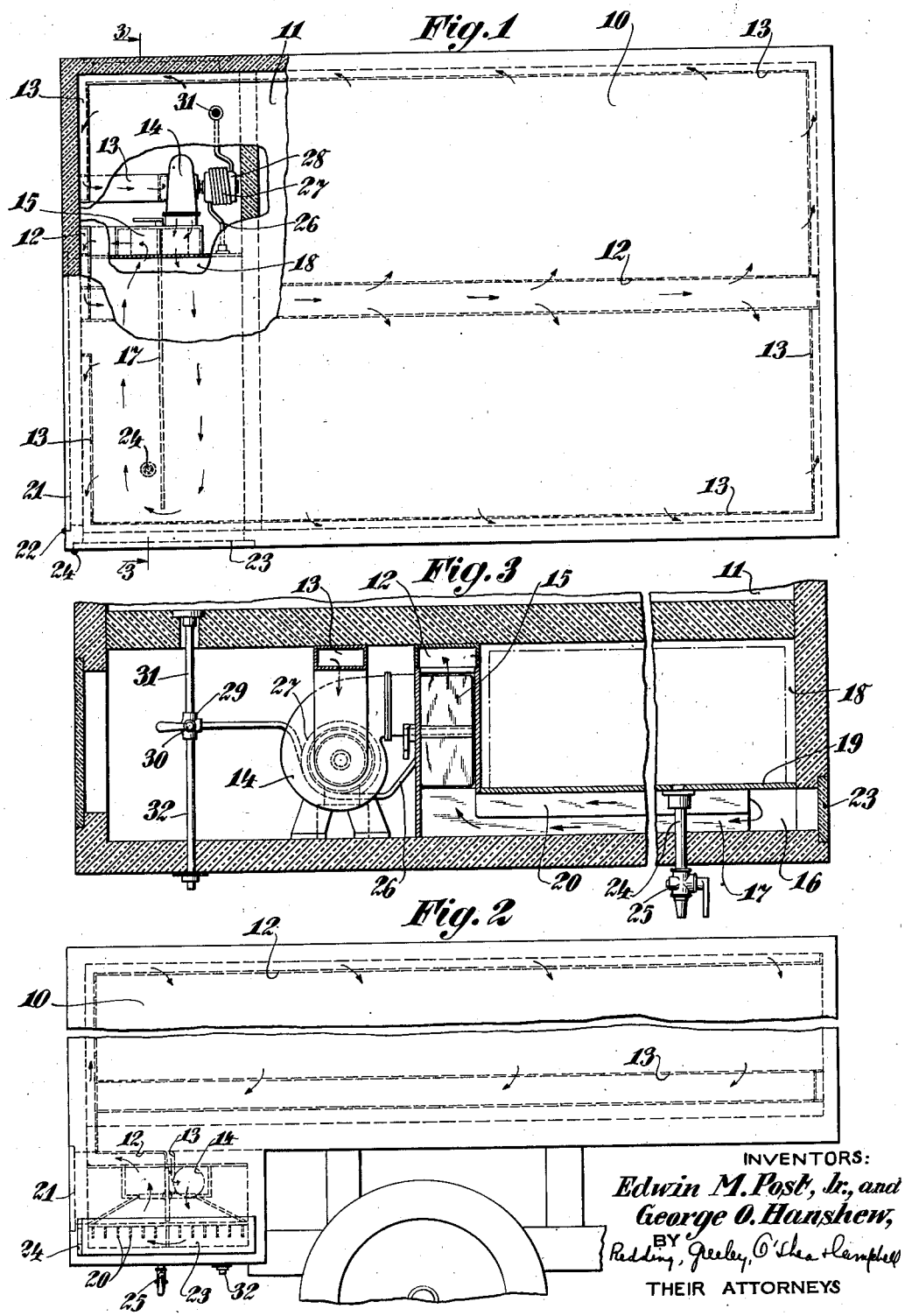
INVENTORS:
Edwin M. Post, Jr., and
George O. Hanshew,
BY
Redding, Greeley, O'Shea & Campbell
THEIR ATTORNEYS Patented Oct. 31, 1933

1,932,533

UNITED STATES PATENT OFFICE 1,932,533

REFRIGERATING BODY

Edwin M. Post, Jr., New York, and George O. Hanshew, Forest Hills, N. Y., assignors to International Motor Company, New York, N. Y., a corporation of Delaware Application May 11, 1933. Serial No. 670,418

4 Claims. (Cl. 62—91.5)

The present invention relates to vehicle refrigerating bodies and embodies, more specifically, an improved refrigerating body construction wherein the refrigerating mechanism may be conveniently and effectively mounted to facilitate the operation thereof and render the refrigerating compartment readily accessible and the refrigerating mechanism capable of being conveniently inspected.

In applicants' copending application Ser. No. 627,310, filed August 3, 1932, for Refrigerating mechanism, a refrigerating mechanism is described for vehicle bodies. This refrigerating mechanism is embodied in the construction described herein and the present invention seeks to provide a vehicle body construction wherein a refrigerating compartment is provided having a maximum volume for a given vehicle construction, the interior of the body having an uninterrupted floor space.

A further object of the invention is to provide a vehicle body of the above character wherein the refrigerating mechanism is so mounted that the compartment therefor is below the refrigerating compartment.

A further object of the invention is to provide a vehicle construction wherein refrigerating apparatus may be effectively mounted to enable the frost and ice to be scraped from the cold elements thereof without disturbing the refrigerating chamber.

A further object of the invention is to provide a vehicle body construction having a refrigerating compartment and a compartment for refrigerating apparatus by means of which the inspection of the refrigerating mechanism and cold element may be effected without disturbing the refrigerating chamber, further provision being made to recharge the refrigerant chamber without disturbing the refrigerating chamber.

A further object of the invention is to provide an exhaust for the refrigerating chamber by means of which vapors or gases therefrom may be discharged into the refrigerating chamber or isolated therefrom at will.

A further object of the invention is to provide an exhaust duct for a refrigerant chamber, such duct passing adjacent a mechanical element of the refrigerating system whereby a heat interchange therebetween is facilitated.

A further object of the invention is to provide a refrigerating mechanism of the above character by means of which refrigerants may be used of varying character, viz: water ice or solid carbon dioxide.

Further objects, not specifically enumerated above, will be apparent as the invention is described in greater detail in connection with the accompanying drawing, wherein:

Figure 1 is a plan view, partly broken away and in section, showing a vehicle body constructed in accordance with the present invention.

Figure 2 is a view in side elevation showing the construction of Figure 1.

Figure 3 is a view in transverse section, taken on line 3—3 of Figure 1, and looking in the direction of the arrows.

With reference to the above drawing, a vehicle body is shown at 10 as provided with a refrigerating chamber 11, this chamber is provided with intake ducts 12 and return ducts 13 by means of which a refrigerating fluid may be circulated through the refrigerating chamber. The ducts 13 are preferably spaced adjacent the bottom and at the sides of the compartment, while the inlet duct 12 is preferably spaced adjacent the top of the compartment. A return duct 13 communicates with a fan blower 14 which circulates the fluid through a valve 15 and a heat interchange compartment 16. With the valve in the position illustrated in Figure 3, the fluid follows the path indicated by the arrows in Figure 1 and flows through compartment 16, the flow being directed by means of a baffle partition member 17 to insure a complete flow of the fluid through the heat interchange compartment. From the chamber 16 the fluid flows into the duct 12 as illustrated in Figures 1, 2, and 3.

The heat interchange compartment 16 is preferably separated from a refrigerant compartment 18 by means of a cold plate 19 having downwardly projecting fins 20. Convenient access to the refrigerant compartment is had by means of a door 21 which may be hinged at 22 to the rear of the body, thus enabling the refrigerant to be inspected and recharged without disturbing the refrigerating compartment 11.

Similarly, the heat interchange compartment 19 is provided with a door 23 which may be hinged at 24 to one side of the body in order that the plate 19 and fins 20 may be inspected and defrosted without disturbing the refrigerating compartment. In order that either water ice or a sublimating refrigerant may be used interchangeably, a drip pipe 24 communicates with the refrigerant compartment 18 and extends through the bottom of the vehicle body, terminating in a drip cock 25.

An exhaust pipe 26 communicates with the refrigerant compartment 18 and is formed with a coil 27, adjacent a motor 28 which drives fan 14. The pipe 26 communicates with a T connection 29 having a two-way valve 30. Valve 30 communicates with a pipe 31 which communicates with the interior of the refrigerating chamber 11 and also communicates with a pipe 32 which extends outside of the vehicle body. In this fashion, the gas or vapor which is discharged from the refrigerating chamber 18 is directed around the motor 28 to cool the same. The gas is then directed to the two-way valve 30 by means of which it may be discharged either into the atmosphere through pipe 32 or into the interior of the refrigerating chamber 11 through pipe 31.

It will thus be seen that a vehicle body has been provided for refrigerating products to be transported, the body being of such nature that the refrigerating compartment space therein is of maximum size and formed with an uninterrupted floor area, the refrigerating mechanism being so mounted that it may be conveniently inspected and conditioned without disturbing the refrigerating compartment. The body is further formed in such fashion that the refrigerating mechanism is below the refrigerating compartment and means is provided for directing the sublimated gas from the refrigerating chamber either into the atmosphere or into the refrigerating compartment.

While the invention has been described with specific reference to the accompanying drawing, it is not to be limited, save as defined in the appended claims.

We claim as our invention:

1. A vehicle body having a chamber, a compartment below the chamber to receive heat transfer mechanism, a refrigerant chamber in the compartment, a heat interchange chamber in the compartment, a heat interchange element in the heat interchange chamber, means in one side of the body to afford access to the compartment, means in the rear of the body to afford access to the refrigerant chamber, and means in the other side of the body to afford access to the heat interchange element.

2. A vehicle body having a chamber, a compartment below the chamber to receive heat transfer mechanism, a refrigerant chamber in the compartment, a heat interchange chamber in the compartment, a motor for circulating a fluid between the refrigerating and heat interchange chambers, an exhaust pipe leading from the refrigerant chamber, and means to afford a heat interchange between the exhaust pipe and motor.

3. A vehicle body having a chamber, a compartment below the chamber to receive heat transfer mechanism, a refrigerant chamber in the compartment, a heat interchange chamber in the compartment, a motor for circulating a fluid between the refrigerating and heat interchange chambers, an exhaust pipe leading from the refrigerant chamber, and a coil in the pipe adjacent the motor.

4. A vehicle body having a chamber, a compartment below the chamber, flow creating means in the compartment, a chamber within the compartment to receive temperature changing means, a heat interchange chamber in the compartment below the last named chamber, a valve chamber having a compartment communicating with an inlet and an exhaust port, and a compartment communicating with the heat interchange chamber, and a valve movable within the valve compartments to direct a fluid flow from the inlet port directly to the exhaust port and from the inlet port through the heat interchange chamber to the exhaust port selectively.

EDWIN M. POST, Jr.
GEORGE O. HANSHEW.